No. 703,639. Patented July 1, 1902.
T. CARROLL.
CASH REGISTER.
(Application filed Sept. 23, 1899.)
(No Model.) 8 Sheets—Sheet 1.
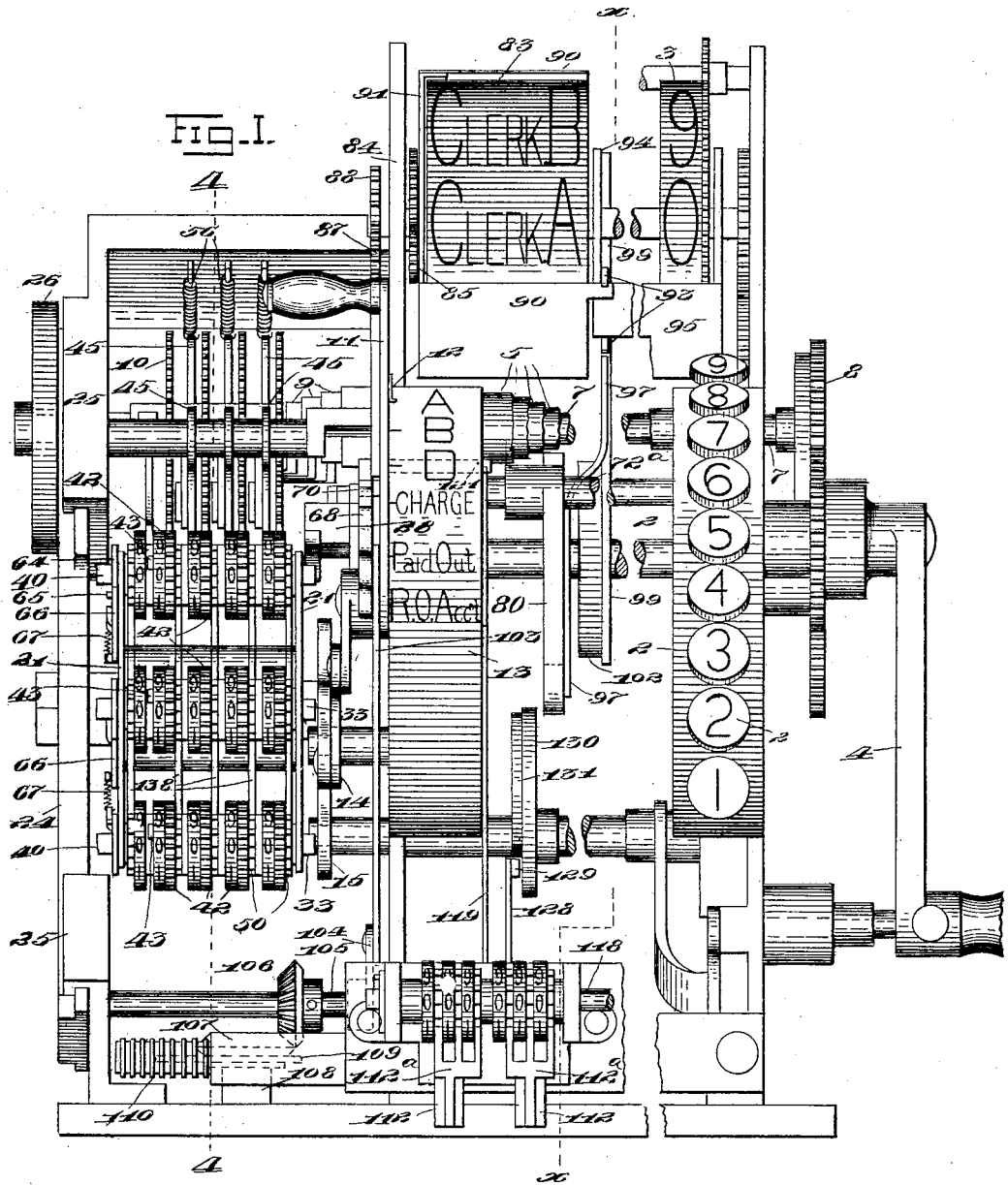
Witnesses
WM. McCarthy
William Muzzy
Inventor
Thomas Carroll.
By Alvan Macauley.
Attorney No. 703,639. Patented July 1, 1902.
T. CARROLL.
CASH REGISTER.
(Application filed Sept. 23, 1899.)
(No Model.) 8 Sheets—Sheet 2.
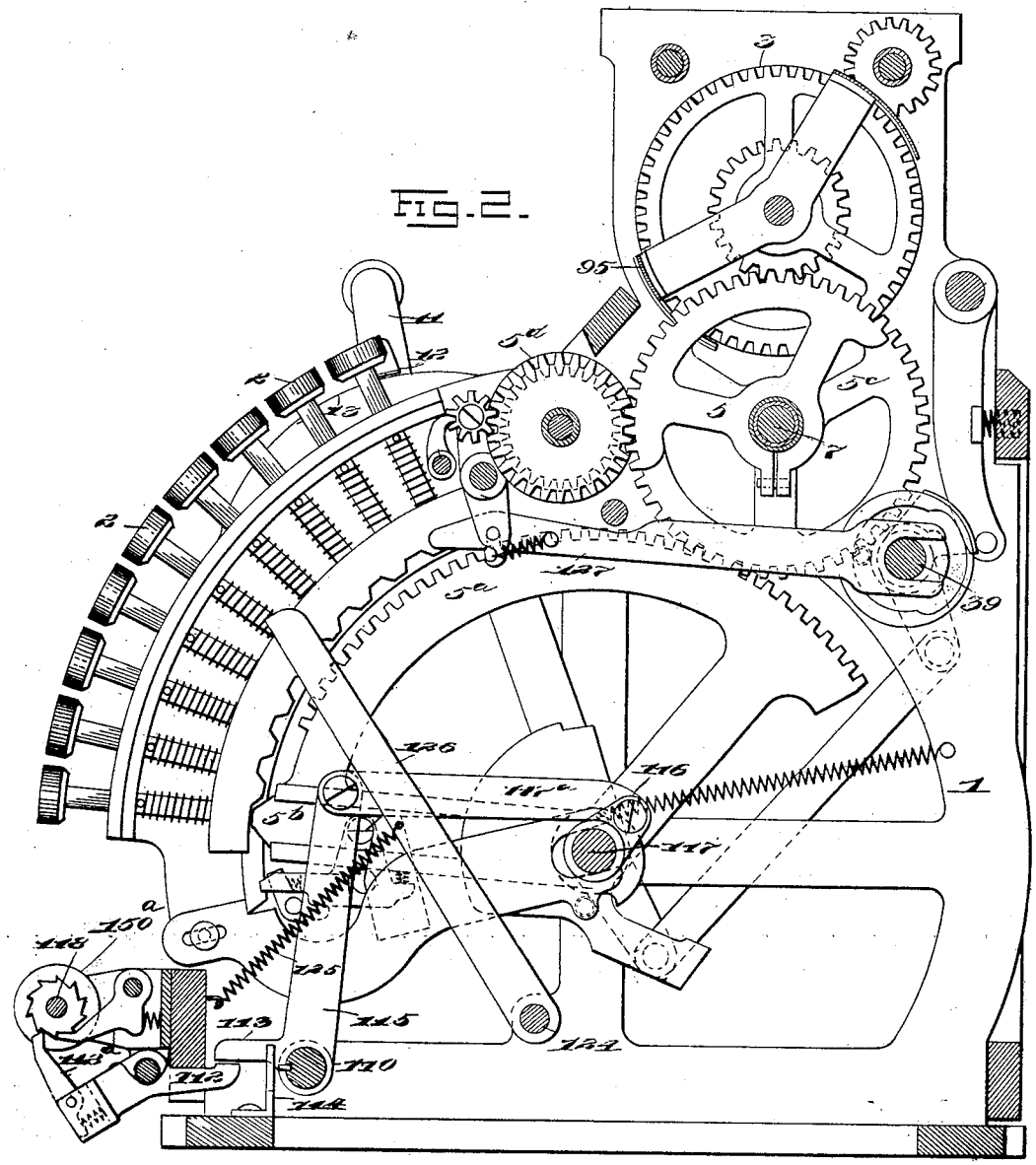
Witnesses
Wm. McCarthy
William Huzzy
Inventor
Thomas Carroll
By Alvan Macauley
Attorney No. 703,639. Patented July 1, 1902.
T. CARROLL.
CASH REGISTER.
(Application filed Sept. 23, 1899.)
(No Model.) 8 Sheets—Sheet 3.
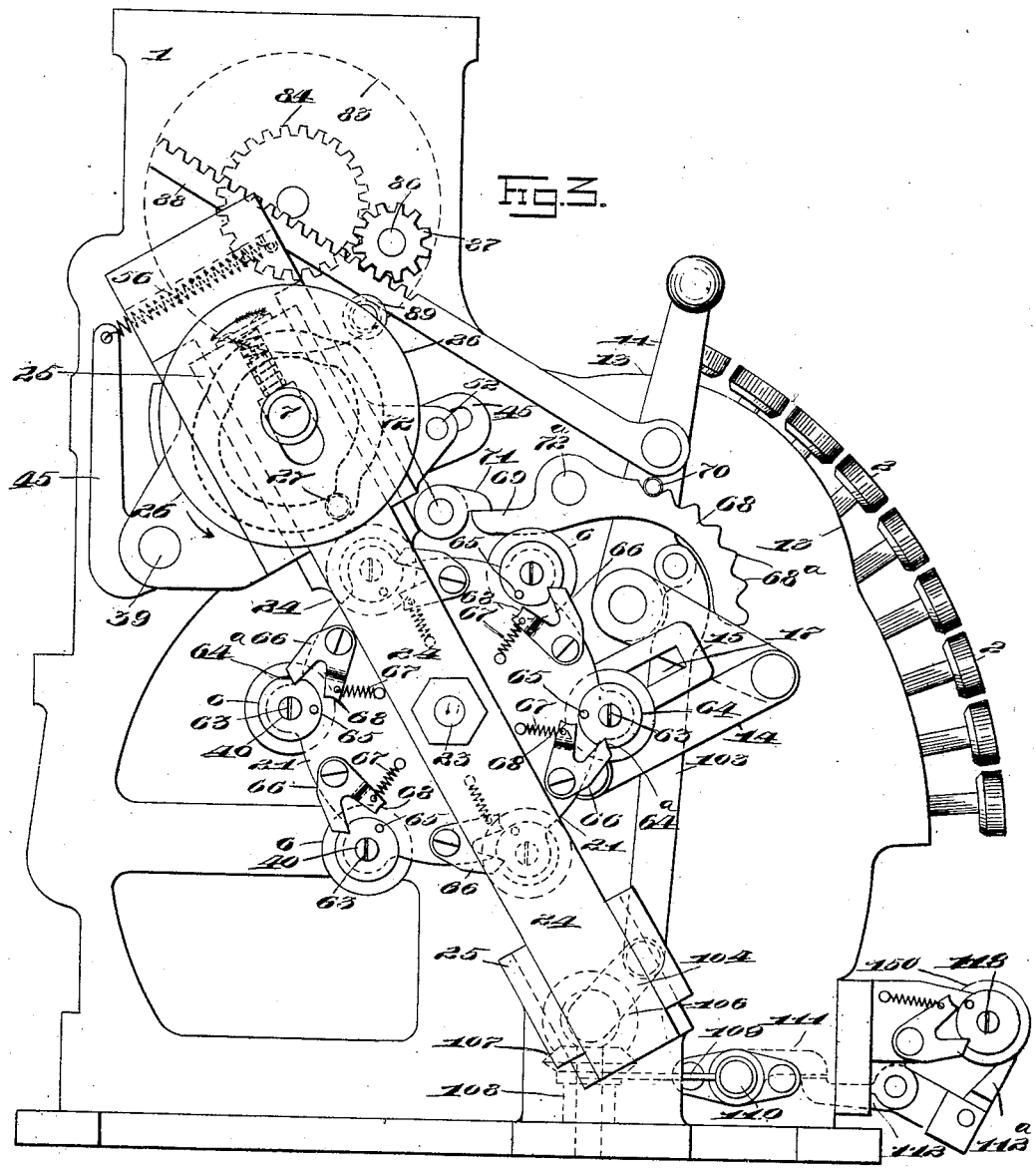

No. 703,639. Patented July 1, 1902.
T. CARROLL.
CASH REGISTER.
(Application filed Sept. 23, 1899.)
(No Model.) 8 Sheets—Sheet 4.
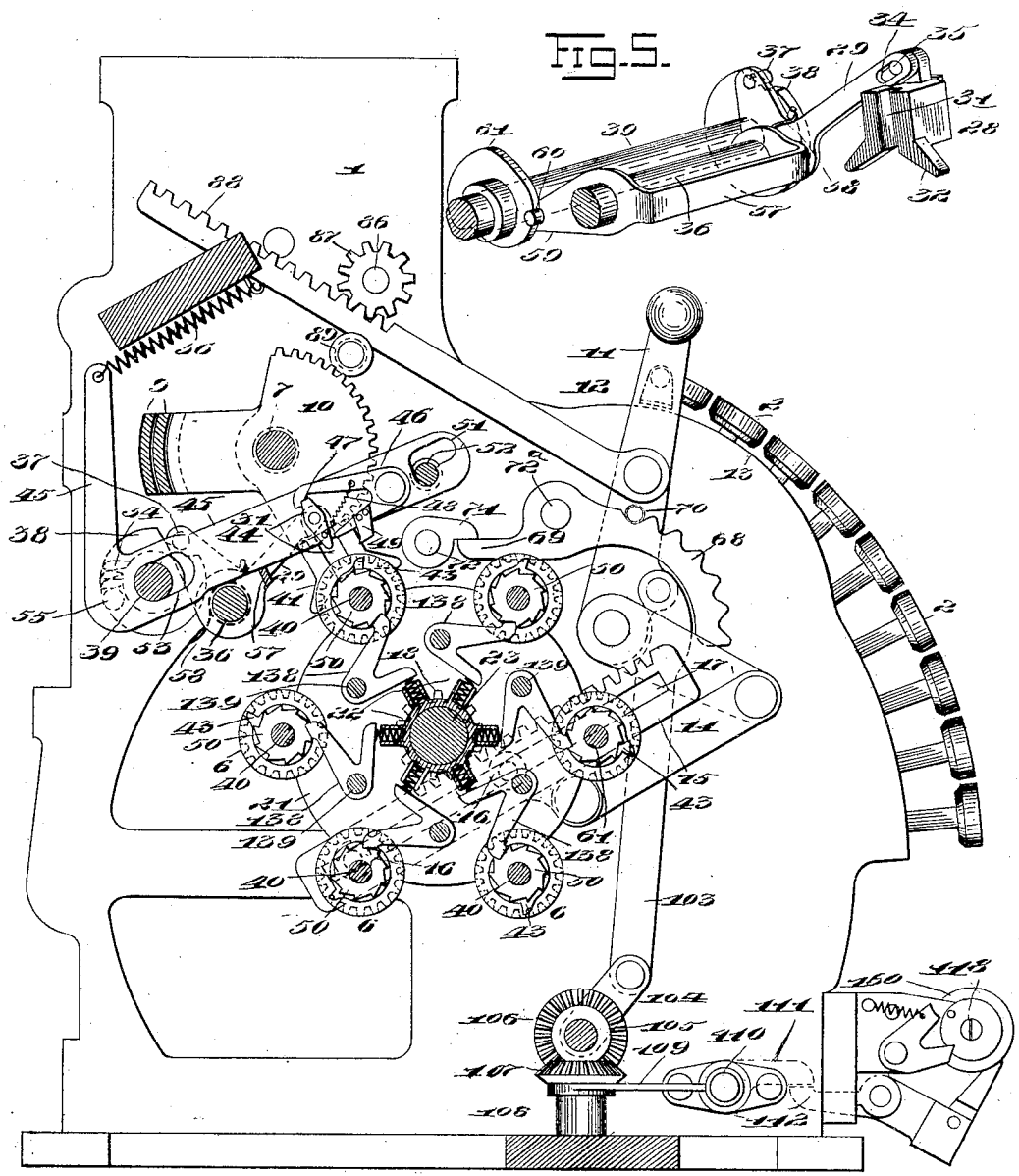
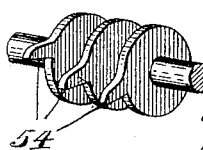
Witnesses Inventor
Thomas Carroll
By Sloan Macauley
Attorney
THE NORRIS PETERS CO., PHOTO-LITHO., WASHINGTON, D. C.

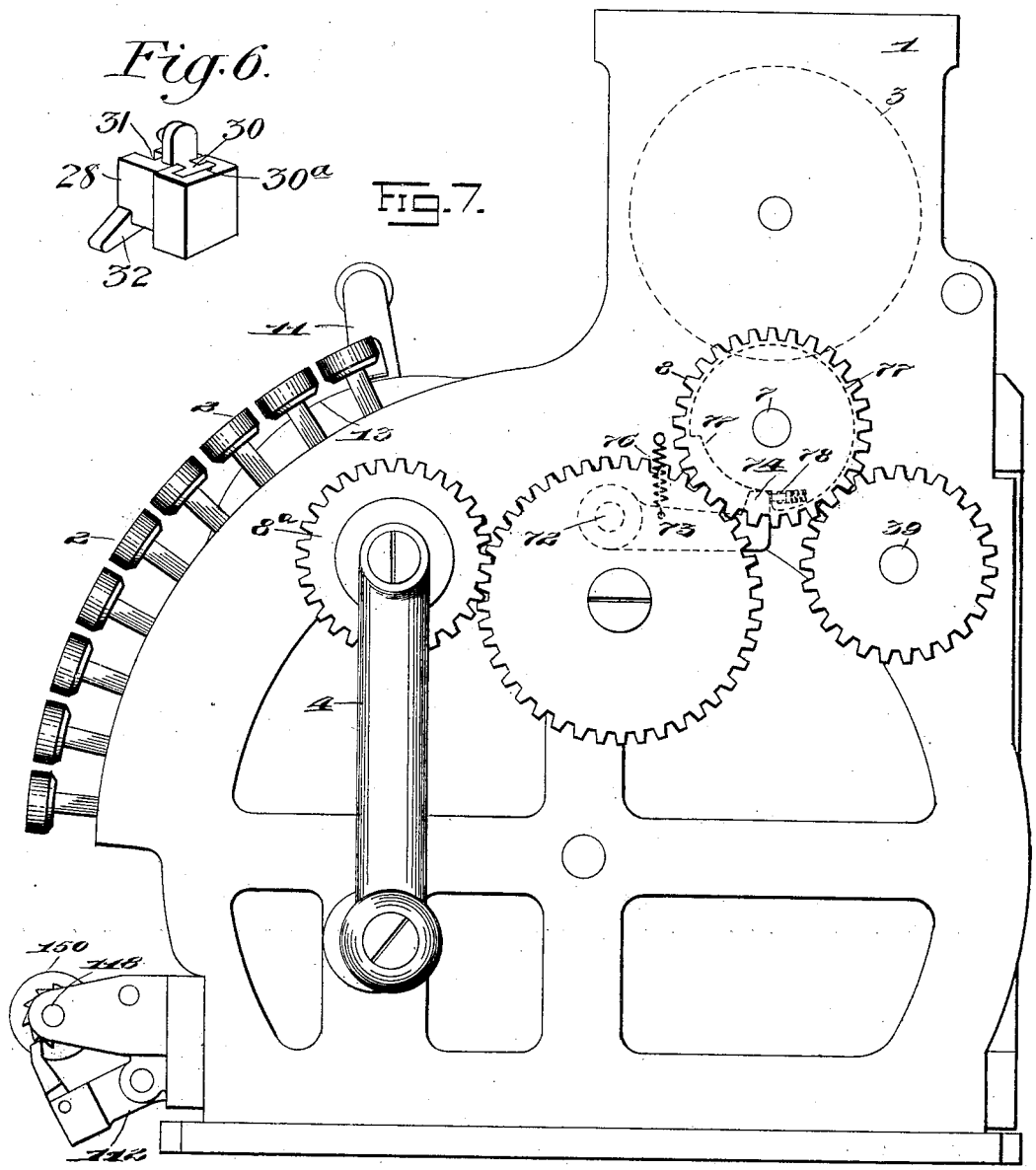

No. 703,639. Patented July 1, 1902.
T. CARROLL.
CASH REGISTER.
(Application filed Sept. 23, 1899.)
(No Model.) 8 Sheets—Sheet 6.

Witnesses
Wm. M. Carthy
William Hugg

Inventor
Thomas Carroll
By Alvan Macauley.
Attorney

THE NORRIS PETERS CO., PHOTO-LITHO., WASHINGTON, D. C.

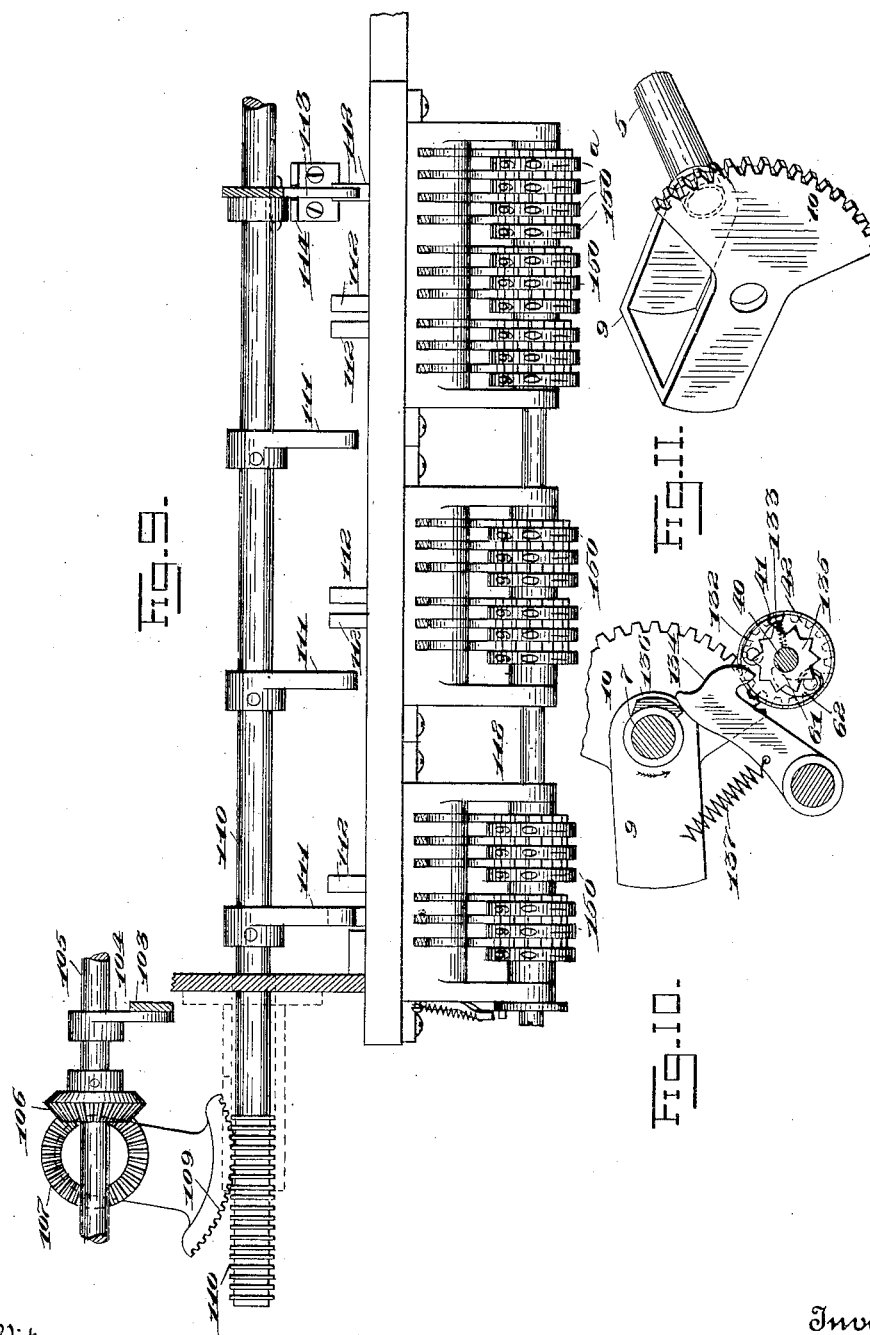

No. 703,639. Patented July 1, 1902.
T. CARROLL.
CASH REGISTER.
(Application filed Sept. 23, 1899.)
(No Model.) 8 Sheets—Sheet 8.

Witnesses
Wm. McCarthy
Wm. H. Muzzy

Inventor
Thomas Carroll
By Alvan Macauley
Attorney

UNITED STATES PATENT OFFICE.

THOMAS CARROLL, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 703,639, dated July 1, 1902.

Application filed September 23, 1899. Serial No. 731,443. (No model.)

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to registers of the multiple or department counter type.

One of the several objects of the invention is the application of a series of independent counters to a machine of the class patented to Messrs. Cleal and Reinhard April 13, 1897, and numbered 580,378.

As many of the parts shown in connection with my present invention are old and well known in the art and are shown and described in the aforesaid patent, I will not describe them in detail here, but will refer to said patent for such detail descriptions.

Figure 8:
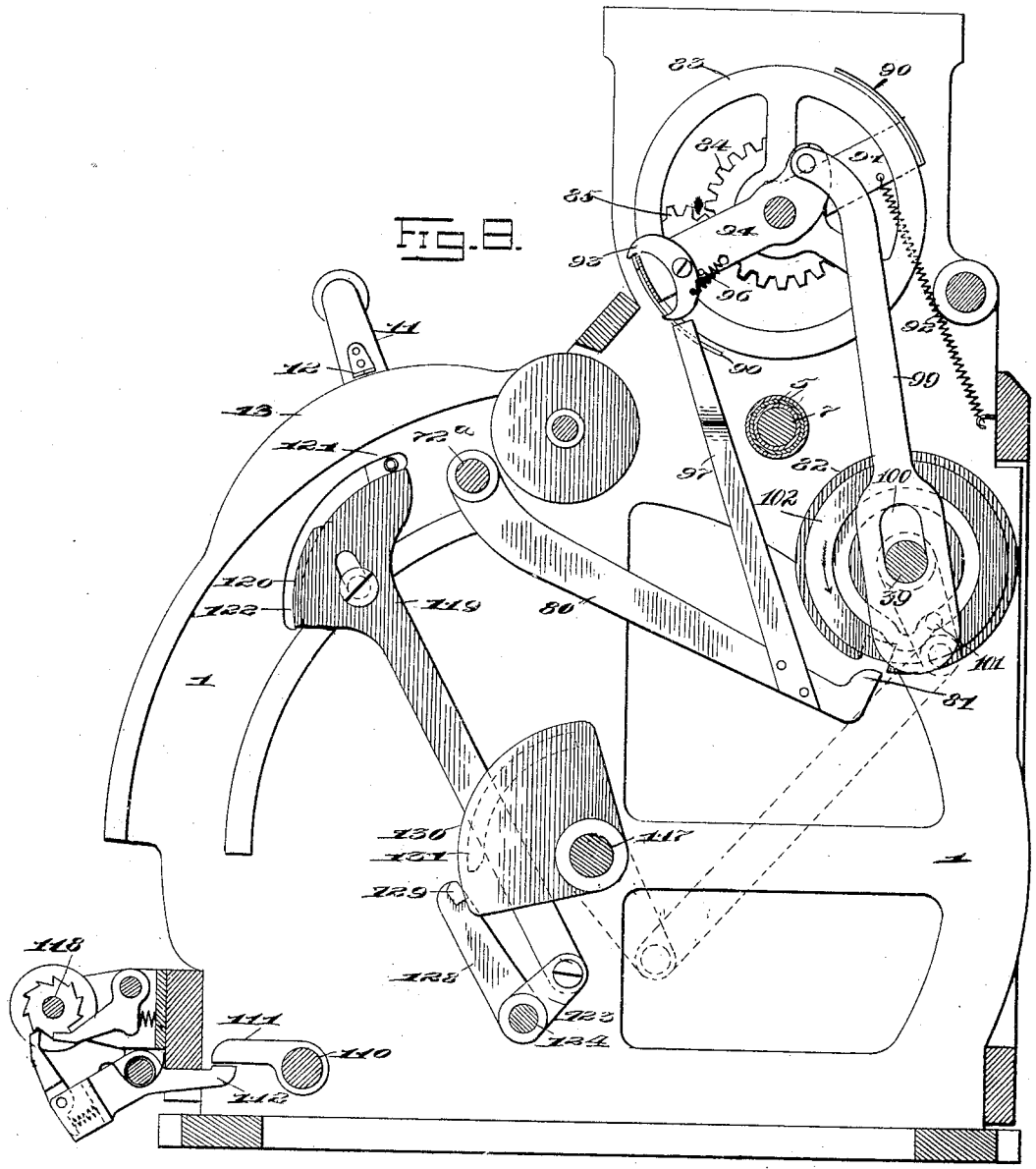
Figure 13:
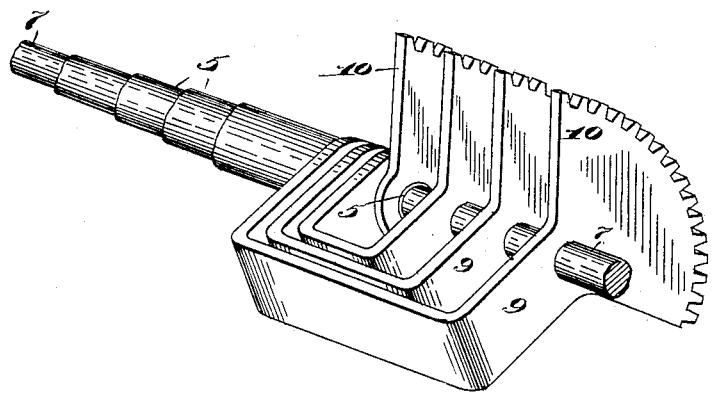
Figure 14:
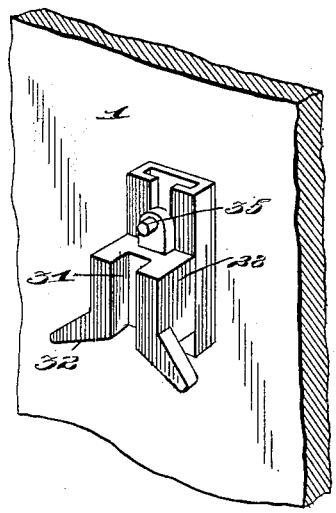

In the accompanying drawings, forming part of this specification, Figure 1 represents a front elevation of a machine of the type mentioned with my invention applied thereto, the cabinet being removed. Fig. 2 represents a central vertical section through the same. Fig. 3 represents an end view of the machine. Fig. 4 represents a vertical section through the counters and operating mechanism. Fig. 5 represents an enlarged detail perspective view of the alining-block, its cooperating parts, and the transfer-bar-supporting yoke. Fig. 6 represents a detail perspective view of the sliding alining-block and its support. Fig. 7 represents an end elevation of the machine to which my improvements have been applied. Fig. 8 represents a vertical section on the line $x$ $x$ of Fig. 1. Fig. 9 represents a detail top plan view of the special counters and their operating devices. Fig. 10 represents an enlarged detail end elevation of the devices for effecting the transfer between the counter-wheels which do not receive motion directly from the operating-segments. Fig. 11 represents an enlarged detail perspective view of one of the operating-sleeves, its segmental gear, and connecting-yoke. Fig. 12 represents an enlarged detail perspective view of the shaft and the cams for operating the transfer-levers. Fig. 13 represents a detail perspective view of the left-hand ends of the nested sleeves with the actuating-segment upon the left-hand end thereof; and Fig. 14 is an inner detail perspective view of the alining-block and the slide therefor, as shown in Fig. 6.

In the said drawings, 1 represents the frame of the machine; 2, the keys; 3, the amount-indicators, and 4 the operating-handle. The several parts of the register, including the keys, amount-indicators, totalizing-counter, operating-segments, and connections with the operating-handle, are substantially described in the said patent.

The type of machine to which my invention is shown as applied is set forth in the patent to Cleal and Reinhard, before referred to, and is, moreover, well known, as it has been upon the market for a number of years, and a great many of them are in daily use, so that for a detailed description of its operation reference is had to the aforesaid patent. Briefly, however, its operation in its general features is as follows:

In Fig. 2 of the drawings the segment $5^a$ and the latch $5^b$, which connects and moves with the segment, are shown in zero position. The segment meshes directly with the intermediate gear $5^c$, which in turn meshes with and drives the usual counter-wheels $5^d$ and the indicators 3, so that if one of the cash-keys 2 be pressed and the crank 4 turned the latch $5^b$ and the segment $5^a$ are swung backward from zero position until the latch is stopped by the inner end of the operated key. This stops also the indicator, leaving it in position to show the value of the operated key, and the wheels of the counter are turned the proper distances, as will be readily understood.

For each vertical row or bank of keys that the machine contains there is a separate latch, segment, intermediate gear, and indicator. To each intermediate gear is secured one of the nested sleeves 5. Said sleeves are secured at their right-hand ends, respectively, to the gears and extend to the left through the side frame of the machine. The inner sleeve turns freely upon a transverse operating-shaft 7, which carries upon its right-hand end a gear 8, which is geared to and driven from the driving-gear $8^a$. It will be readily understood that as the sleeves respectively are secured rigidly to the gears they will respectively turn different distances when the crank 4 is actuated, according to the value of the operated keys. The left-hand end of said sleeves, as shown in Figs. 1, 11, and 13, are provided, respectively, with ∪-shaped yokes 9, which are themselves nested—that is, they are arranged to swing one within the other. The right-hand leg of each yoke is secured to its respective sleeve, and upon the left-hand leg of each yoke is formed a segmental gear 10, which is journaled upon the left-hand end of the shaft 7.

It will be understood that in machines of this kind the bank of keys of the lowest denomination—that is, the "cents-bank"—is generally placed near the right-hand side of the machine. To the left of the cents-bank is the "dimes-bank," then the "dollars-bank," &c. As the sleeves 5 extend to the left and transmit the movement from their respective segments, it is necessary to employ the yokes 9 in order to bring the segmental gear 10, which is moved by the segment $5^a$, which coöperates with the cents-bank of keys, to the right of the other segmental gears 10. The segmental gear which is moved by the dimes-bank of keys is to the left of the cents segmental gear 10. The dollars segmental gear is to the left of the dimes segmental gear, &c. This arrangement is necessary in order that the wheels of the counters 6, which are operated thereby, may read properly and in the usual manner from left to right.

The embodiment of my invention shown in the drawings comprises six independent counters 6, which are mounted in a rotary drum. An adjusting-lever 11, carrying an index-pointer 12, which plays over a graduated index-plate 13, is secured to the drum in which the independent counters 6 are carried, and by moving the adjusting-lever up and down one or the other, as desired, of the independent counters may be brought into position to be subsequently engaged by the segmental gears 10 when the operating-crank 4 is turned. The index-plate 13, as shown in Fig. 1, bears characters and words which designate the respective independent counters. In the present instance the six counters are designated "A," "B," "C," "Charge," "Rec'd on acc't," and "Paid out." The present arrangement contemplates the use of the first three counters mentioned for different clerks and the last three for recording the various special transactions.

The adjusting-lever 11 is of bell-crank formation and has its lower arm pivotally connected to a link 14. This link is in turn pivotally connected to a sliding rack-bar 15, which latter is slidably mounted on headed bolts 16, supported by the main frame and passed through the elongated slot 17. Said rack-bar normally meshes with a pinion 18, fast on the rotatable drum, which carries the counters 6 and comprising spaced side plates 21 and a hub 22, which latter is journaled upon a shaft 23. (See Figs. 1 and 4.) This shaft is fast at its left-hand end to a slide 24, (see Figs. 1 and 3,) which is mounted at its upper and lower ends in suitable guides 25, formed on the main frame. The extreme left-hand end of the shaft 7 carries a cam-grooved disk 26, (see Fig. 3,) which lies in proximity to the side of the slide 24, and into the cam-groove of which projects a pin 27, mounted on said slide, so that upon the rotation of said disk the slide will be reciprocated and elevate or depress the drum carried thereby, according to the configuration of the cam-groove. The rotation of the drum through the medium of the rack-bar causes the respective counters 6, which are mounted in said drum, to be successively brought to operative position. When the keys have been pressed and the adjusting-lever 11 set and the crank 4 turned, the shaft 7, and consequently the cam-disk 26, will be given a complete revolution. This will raise the counter-carrying drum, and the actuating-pinions 42 of the counter which has been turned to operative position will be thrown into mesh with the segment-gears 10. In order, however, to insure the gears of the counter being thrown squarely into mesh with the segment-gears and for the further purpose of preventing the counter-carrying drum from being unintentionally turned, an alining mechanism is provided, consisting of a slidable alining-block 28 and an operating bell-crank lever 29 therefor. The block is secured to a slide 30, which is mounted in suitable slideways $30^a$, secured to the main frame. The block has also an alining-groove 31, formed by the alining-arms 32, which flare at their lower ends. When the crank-handle 4 is operated, the block 28 is moved downward before the upward movement of the slide 24 and disengagement of the rack 15 and pinion 18 takes place, so that its arms 32 straddle one of a series of alining-pins 33, mounted on the drum, and thus hold said pin against lateral movement and guide it into the groove 31, whereby as said drum is moved upward by the movement of the machine the pin, and consequently the counter upon which the registration is to be made, will be guided accurately to registering position. The reciprocation of the block 28 is brought about by the bell-crank lever 29, which in its longer arm has a slide 34, Figs. 4 and 5, into which a pin 35, secured upon said block, projects. Said lever is journaled on the transverse shaft 36, mounted in the frame, and a pin 37 is secured to its shorter rearwardly-extending arm and coöperates with a revolution-cam 38. Said revolution-cam is fast upon the rotation-shaft 39, Figs. 2 and 7, which extends transversely the length of the machine. Upon its right-hand end, as shown in Fig. 7, is a gear meshing directly to the gear-wheel 8 and by which said shaft, and consequently the rotation-cam 38, is given a complete turn whenever a registration is made upon the machine. The pin 37 of the bell-crank 29 is held constantly against the periphery of the rotation-cam 38 by a spring 58, which is coiled to the shaft 36, (see Fig. 4,) and one end of which presses against the permanent frame 1 of the machine, and the other end is attached to a pin carried by said bell-crank lever. The parts are shown in normal position in Fig. 4; but when the crank 4 is started the bell-crank is swung and the block 28 is thrown downward almost immediately by the cam, and said block is held in its downward position until near the end of the movement of the crank-handle 4, when the notch in the cam periphery coming opposite the pin 37 permits the spring 58 to move the bell-crank lever, and consequently the block 28, back to elevated normal position.

The counter-carrying drum, it will be noticed, carries six counters, each of which is in all respects a duplicate of the others. Each comprises a central shaft 40, upon which is mounted the counter-wheels 41, &c. Each counter consists of five counter-wheels, upon the periphery of which the digits from "0" to "9" are impressed in the usual manner. As shown in the drawings, all of the counter-wheels of each counter except the one upon the left-hand end carries fast thereto pinions 42, which are arranged to mesh with the segment-gears 10. Of course the counter-wheels will never be turned upon their shaft 40 by the segment-gears 10 except when they are in operative position; but when in said operative position and when all of the first three counter-wheels beginning on the right-hand side (shown in Fig. 1) have made a complete revolution a trip-finger 43, fast thereto, engages and operates the trip-pawl 44, which is pivoted to and carried by one of the three transfer levers or slides 45. The trip-pawls 44 normally hold up in normal position, as shown in Fig. 4, the three transfer-pawls 46, respectively, which are each mounted to one of the transfer-levers 45 by resting against a shoulder 47, formed in said transfer-pawls. A coil-spring 48 normally holds the trip-pawl and the transfer-pawl in engagement.

When a counter is in operative position and one of its counter-wheels has made a complete revolution, its particular trip-finger 43 will contact with the respective trip-pawl 44, and thereby permit the spring 48 to swing the proper transfer-pawl down from normal position, and a spur 49, secured to the lower leg of the transfer-pawl, will lie in the path of the teeth of the ratchet-wheel 50, and when the transfer-lever 45 is subsequently reciprocated the said spur will strike the ratchet-teeth and turn the ratchet-wheel and the counter-wheel, which is carried thereby, one notch, and thereby effect the transfer from the counter-wheel of one denomination to the counter-wheel of the next higher denomination. While a transfer is being thus effected the spur 49 is engaged with the periphery of the ratchet-wheel 50, and the rearward movement of the transfer-lever 45 brings the pivotal center of the transfer-pawl 46 closer to the shaft 40, upon which the ratchet-wheels are journaled, and thereby as the ratchet-wheel is turned the transfer-pawl is gradually elevated until as it reaches normal position the trip-pawl 44 snaps under the shoulder 47, and thereby retains the transfer-pawl again in normal position until it is again dropped. Any retrograde movement of the ratchet-wheels 50 is prevented by a series of angular spring-pressed pawls 138, mounted on spaced rods 139, which are in turn mounted in the drum.

The tripping of the pawls 44 usually occurs when the pinions 42 are engaged with the segments; but at other times the tripping occurs when the pinions and segments are disengaged and because of a previous transfer. In either case the longitudinal movement of the lever 45 to effect the transfer cannot occur until the pinions and segments are out of mesh, so that the counter-wheels can move independently of the segments. The position of a counter in which a transfer takes place is intermediate the extreme upper and lower positions, so that the counter-pinions may be disengaged from the operating-segments and the counter-ratchets still remain in the paths of the noses 49. To allow a vertical movement, each of the levers 45 is formed at its forward end with an angular slot 51, through which projects a transverse supporting-shaft 52. These angular slots allow both longitudinal and vertical movements of the levers 45, so that the latter, being spring-pressed, follow the ratchets 50 when they are elevated or depressed by the raising or lowering of the drum. When the levers are in their upper positions, they are locked against any longitudinal movement by the shaft, which then extends through the vertical portions of the angular slots. The rear ends of said levers 45 are slotted, as at 53, to receive the shaft 39, upon which said levers are supported.

The shaft 39 is provided with a series of graduated cams 54, (see Figs. 4 and 12,) arranged to successively operate the transfer-levers 45 by engaging antifriction-rollers 55, mounted thereon. The levers are normally drawn forward by coil-springs 56, which connect their upper ends to a part of the main frame. As before stated, the levers 45 are moved up and down at their forward ends to follow the movements of the drum, being normally held elevated at their forward ends against the tension of their springs 56 by a yoke 57. (See Figs. 4 and 5.) This yoke is provided with an operating-arm 59, which carries a pin 60, arranged to coact with a cam 61, fast to the shaft 39, whereby the yoke is normally elevated against the tension of the springs 56 of the levers 45. When the shaft 39 is rotated, the cam 61 allows the pin 60 to ascend, and consequently the yoke 57 to descend, so that the forward ends of the levers 45 may move downward under the impulse of the springs 56.

From the above description it will be seen that when one of the first three counter-wheels has made a complete revolution it will trip its respective pawl 44, and thus allow the transfer to fall to transferring position, so that when its lever 45 is moved longitudinally it will engage and operate the ratchet-wheel 50 of the next higher counter-wheel.

The above-described transfer devices are provided only for the counter-wheels which receive movement directly from the operating-segments, the transfers between the remaining wheels being effected by the following devices: The fourth wheel of each counter is, as shown in Fig. 10, provided with a pivoted spring-pressed pawl 132, having a laterally-projecting lug 133. When the wheel has made a complete revolution, the pawl is depressed by engaging under a cam-lever 134, and thus brings the lug 133 into mesh with the teeth of a star-wheel 135, fast to the adjacent counter-wheel of next higher denomination. As the pawl 132 continues its movement it carries the star-wheel with it until it passes from under the same lever 134, and thus moves the counter-wheel to which it is attached one unit. The cam-lever 134 is so constructed as to only hold the pawl to engagement with the star-wheel long enough to move the latter one tooth. As the transfer through the medium of this pawl 132 takes place both in the upper and lower positions of the counter-wheels, I arrange to move the cam-lever 134 so as to always bear the same relation to the pawl. This movement is effected by a cam 136, mounted on the shaft 7, so as to turn therewith, and arranged to engage the cam-lever and force the same forward against the tension of a spring 137, which normally draws it back.

Each of the counter-shafts 40 which is journaled in the side plates 21 of the counter-drum is formed with a longitudinal groove 61, one wall of which is adapted to engage spring-pressed turn-to-zero pawls 62, mounted on the counter-wheels, when said shaft is rotated, so as to pick up and return said wheels to zero in a manner well known in the art. The outer end of each shaft is also grooved, as at 63, (see Fig. 3,) for the reception of a suitable key for rotating the same. The outer end of each shaft is further provided with a cam-disk 64, having a stop-pin 65 and adapted to engage a bell-crank stop-pawl 66, pivoted on the drum. Each pawl is normally held in engagement with a notch 64$^a$ in its cam by a coil-spring 67, which connects it with the drum. When the cam is rotated in turning the counter-wheels to zero, it forces the pawl 66 so far forward as to bring its notched end 63 into the path of the pin 65, so that when the zero position is reached the cam will be arrested by the pin becoming seated in said notch in a manner well known in the art. The drum is moved upward to bring the pinions 42 into mesh with the segments 10 before the forward movement of the latter is commenced and is moved downward to disengage said pinions and segments after the end of the forward movement of the latter and before they have started their return movements.

By moving the adjusting-lever 11 to the proper position any desired counter may be brought to operative position, and by then rotating the handle 4 the amount set by the operated keys will be added thereon, as well as on the usual totalizing-counter.

As an additional means for alining the adjusting-lever 11 and for also locking the same in place after it has been moved to the desired position I provide a pivoted segmental alining-lever 68, having a toothed periphery and formed with an operating nose or extension 69. This lever is normally forced upward against an antifriction-roller 70, mounted on the lever 11, by a nose or projection 71, fast to a rock-shaft 72 and engaging the nose 69. The opposite end of the shaft 72 is provided with a locking-pawl 73, as shown in Fig. 7. This pawl is formed with a locking-nose 74, which is connected to the main frame by a coil-spring 76. The action of said spring holds the lever 68 in position and also forces the nose 74 against a locking-cam 77, fast to one of the operating-gears. The said cam 77 is provided with a spring-pressed locking-bolt 78, into the path of which the nose 74 normally projects to lock the cam and gear carrying the same against movement, and thus consequently lock the machine.

When the lever 11 is moved to bring the desired counter to operative position, the lever 68 is depressed every time the roller 70 moves over one of the projections 68$^a$ on the periphery of said lever, and the shaft 72 is thus rocked. This rocking of the shaft operates the pawl 73 to such an extent that the nose 74 passes below the plunger 78 and allows the same to spring forward over said nose, so as to hold the pawl 73 out of locking position. After the cam 77 has been rotated by the operation of the machine the nose 74 again becomes locked against the plunger 78.

It will be seen that by employing the above construction it becomes necessary to move the lever 11 each time before the machine can be operated, thus calling the operator's attention to the fact that he must set the proper counter for operation before he can manipulate the machine.

The upward pressure of the lever 68 under the impulse of the spring 76, which is at the other end of the machine, tends to properly aline the lever 11 if the same is to one side or the other of its proper position by causing the roller 70 to become seated firmly in the notch formed between two of the projections 68ª of said lever.

As it is desirable to lock the lever 11 against movement after the crank 4 has been started to prevent any fraudulent manipulation, I provide means for locking the lever 68 up against the roller 70. This means consists of an arm 80, fast to the shaft 72ª, Figs. 3 and 8, upon which lever 68 is mounted and formed with a locking-nose 81. This nose coöperates with a notched disk 82, fast to the rotation-shaft 39 of the machine. When the disk 82 is in normal position, the notch in the same is in alinement with the nose 81, and thus permits movement of the arm 80; but after the disk has been moved even very slightly from normal position the nose 8 bears upon the periphery of said disk, and thus prevents rocking of the shaft 72ª and movement of the lever 68.

The foregoing description relates to devices for registering the amounts on any one of a series of independent counters, and I will now pass on to a description of the means for indicating which of the several counters is being employed in connection with any of the transactions. The special indicator 83 (see Fig. 1) for this purpose is of the rotary type and is mounted in substantially the same manner as the regular amount-indicators employed on this class of machine. This special indicator is marked upon opposite sides with duplicate characters or words similar to those upon the index-plate 13 and is provided on the left-hand side with an operating-gear 84. This gear meshes with a pinion 85, fast to a short shaft 86, journaled in the main frame and carrying another pinion 87. This latter pinion, as best shown in Fig. 3, is engaged by rack-bar 88, which is held to mesh therewith by an antifriction-roller 89, upon which it rests. The bar 88 is pivotally connected to the lever 11, so as to move therewith, and thus actuate the special indicator to bring the correct indication into indicating position. The character exposed upon the special indicators depends, of course, upon the position of the adjusting-lever 11. The special indication does not become exposed at once, but is concealed by shutters 90, Figs. 1 and 8, mounted on the opposite ends of a lever 91, which is pivoted upon the indicator-shaft. Said lever 91 is normally drawn into the position in which the shutters hide the indicator by a coil-spring 92, which connects it to the main frame, as shown in Fig. 8. By reference to this figure it will be seen that said shutters 90 are held to expose the indicator by a latch-pawl 93, which engages one of the same. This pawl is mounted on one of the supporting-arms 94 of the main flash 95 and is drawn forward to engage the plate 90 by a coil-spring 96, which connects it with the arm 94. When the lever 11 is operated and the arm 80 thereby elevated, a trip-arm 97, mounted on said arm 80, engages the lower end of the pawl 93, and thereby trips the same to release the plate 90, so that the shutters will move to hide the special indicator before the regular flash is moved. When the regular flash is subsequently operated, the pawl again catches over the shutters 90, and as the main flash moves to expose the indicators the shutters move with it. It will be observed that if the adjusting-lever 11 be moved even slightly the shutters will be instantly released and its spring will throw it into position to cover the characters on the special indicator. The main flash, which is substantially of the construction of the shutters, is arranged to expose and conceal the amount-indicators and is positively operated in both directions by operating bar 99, connected thereto and slotted at 100 and provided with a pin 101. (See Fig. 8.) The shaft 39 passes through said slot and is provided with a cam-grooved disk 102, into which the pin 101 projects. As the shaft 39 is rotated the flash is first moved to concealing position and then to exposing position, the latter movement also drawing the special flash back to exposing position, as before described.

In a machine of the type herein described it is very desirable that an independent record be kept of the number of special sales or the number of special transactions made in each department as represented by the independent counters. To accomplish this result, I provide a series of special counters 150 and arrange to operate the same as follows: The lever 11 is provided with a pendent link 103, (see Fig. 4,) which is pivotally connected to a crank-arm 104, fast to a short shaft 105, which latter is suitably journaled in the main frame and carries a bevel-pinion 106. This pinion meshes with a similar pinion 107, journaled on a vertical stud 108 and carrying a segmental rack 109, as best shown in Fig. 9. This rack meshes with a cylindrical rack-bar 110, which is so mounted in the main frame that it may be slid longitudinally. A series of operating-arms 111 are mounted on this rod and are adapted to coöperate with arms 112 (see Fig. 8) of special counter-operating pawls when the rod is rocked, as hereinafter described. It will be observed by reference to Fig. 9 that there are seven of the pawl-carrying arms 112, six of which are arranged to actuate, respectively, the six special detail counters and the seventh, the one on the right-hand end, a grand total of all the special counters. There are three arms 111, each of which is arranged to operate either of two of the arms 112, according to the degree of movement of the rod 110. The minimum movement of the rod will cause the first arm 111 to come into alinement with the first pawl-carrying arm 112. The second degree of movement will cause said first arm 111 to come into alinement with the second pawl-carrying arm 112. The third degree of movement will cause the second arm 111 to come into alinement with the third arm 112, and so on through the series.

The arm 113 for operating the pawl-carrying arm of the totalizing special counter 150ª is splined upon the rod 110 and is held in permanent alinement with its respective arm 112 by a slotted plate 114, fast to the main frame and in which said arm 113 plays. As shown in Fig. 2, the arm 113 has an upward extension 115, which is connected to the crank-arm 116, mounted in the main rock-shaft 117, by a link-bar 117ª, from which it results that the rod 110, with all of the actuating-arms 112 and 113 thereon, is rocked by the shaft 117 whenever the crank 4 is turned, or, in other words, whenever a registration is recorded upon the machine. The totalizing special counter is therefore actuated whenever a sale is registered, and at the same time one of the six special detail counters is actuated. One of the special detail counters is appropriated to each of the six counters which are mounted in the drum, and whenever a registration is recorded upon a particular counter the corresponding special detail counter is actuated accordingly.

The wheels of the special counter and the coöperating mechanism by which, when the first wheel at the right-hand end has completed a revolution it will transfer to the wheel of next higher denomination, &c., are of the numerous well-known forms. The actuating-pawls 112ª, which are mounted in the pawl-carrying arms, coöperate with the usual ratchet-wheels in the usual manner. Whenever a registration is made upon the machine, the primary wheel of the totalizing-counter 150ª is turned so that the wheels show one more.

All of the wheels of the special counter are mounted upon a single shaft 118, which latter is arranged to be rotated to turn the wheels to zero in substantially the same manner as the shafts of the independent department counters.

As shown in the present machine, (see Fig. 1,) the three lower designations on the index-plate represent the transactions of "charge," "paid out," and "received on account." When the counters used to record these special transactions are operated, it is desirable to throw out the main or totalizing counter. The devices for accomplishing this result are best shown in Figs. 2 and 8 and comprise a slidable plate 119, having a slot-and-pin connection with the frame and formed at its upper end into a segment having a raised flange 120 upon its periphery. An antifriction-roller 121 is carried by the lever 11 and is arranged to play through a slot 122, formed in the frame so as to project above the segmental upper end of the plate 119. During the first half of the downward movement of the lever 11 the plate 119 remains passive; but whenever the adjusting-lever 11 is in such position that its index 12 points to "Charge," "Paid out," or "Received on account" the roller 121 will have passed on to the flange 120, thereby forcing the plate 119 downward. This slide is pivotally connected at its lower end to a crank-arm 123, mounted on a rock-shaft 124, so that when the slide is depressed said shaft will be rocked. This rocking of the shaft is against the tension of a coil-spring 125, which connects a trip-arm 126, mounted on said shaft to the main frame. (See Fig. 2.) The upper end of the arm 126 is rounded, as shown, and when thrown rearward by the complete rocking of the shaft 124, as hereinafter described, contacts with and raises the forward end of an operating-bar 127, which is connected to the operating mechanism to throw it into and out of gear in a manner well known in the art and shown and described in Patent No. 589,114, granted August 31, 1897, to F. H. Bickford. The shaft 124 further carries an arm 128, which is provided near its outer end with a bevel-lug 129. The shaft 117 carries a segmental plate 130, having a cam-flange 131, so that when the shaft 124 is partially rocked, as before described, this lug will be engaged by the cam-flange 131 and the arm 128, thus drawn rearward to give the shaft 124 its complete rocking movement. The said lever travels inside the cam-flange 131 during the travel of the crank 4, which rocks the shaft 117, and the said flange thereby holds the shaft 124, and consequently the trip-arm 126, in their operative position and prevents an evil-minded person from moving the adjusting-lever so as to throw in the mechanism to operate the totalizing-counter 5ᵈ.

The designations shown for the six independent counters are of course not confined to any fixed arrangement and may be altered to accommodate them to the special requirements of different business houses. For instance, all of said counters may be used to keep different clerk's accounts or they may be all used to keep the sales of different classes of merchandise separate. In either of these cases the devices for throwing out the main counter would have to be omitted. The means for throwing out the registering mechanism may be varied so that the totalizing-counter 5ᵈ may be thrown out of operative condition in connection with the operation of as many or as few of the counters carried by the drum as may be desired.

It is evident that numerous modifications may be made in my invention without departing from its spirit. In the specification I have referred to the counter 5ᵈ as a "main" or "totalizing" counter; but this was only for the purpose of explaining the present specific embodiment of my invention, for it is evident that this counter could be used to record a separate total independent of all the other counters by suitable and simple changes in the construction of the machine. Likewise I have referred to the counters which are carried by the drum or frame as "independent" counters; but these may or may not be independent of each other or of the main or totalizing counter, as it would be entirely within the scope of my invention to have two of the counters carried by the frame arranged to be simultaneously actuated by the operating devices. Many other changes in the construction and arrangement to meet the varying demands of the trade may be made and will be apparent to any one skilled in the art.

Having thus described my invention, what I claim as new, and desire to secure by Letters Patent, is—

1. In a cash-register the combination with an operating mechanism of counter-operating devices, a movable frame carrying a series of independent counters any one of which may be brought into connection with the counter-operating devices, means for moving the frame and a single series of transfer-pawls for actuating the counters independently of the counter-operating devices and arranged to coact with any one of said counters.

2. In a cash-register, the combination with an operating mechanism of counter-operating devices, a movable frame carrying a series of independent counters each of which comprises a series of counter-wheels which may be brought to position to be actuated by the counter-operating devices, and a single series of transfer-pawls mounted independently of the movable frame and arranged to be operated independently of the counter-operating devices and to actuate the counter-wheels of any one of the counters which is brought to operative position by the movement of the frame.

3. In a cash-register, the combination with an adjusting-lever, a special indicator, arranged to be set thereby, a flash for said indicator, a movable member carrying a latch for the flash and means connected to the lever for tripping the latch.

4. In a cash-register, the combination with an adjusting-lever, of an indicator arranged to be set thereby, a spring-drawn flash for said indicator, a movable member carrying a latch for said flash and means connected to the lever for tripping the latch.

5. In a cash-register, the combination with a lever, a special indicator arranged to be set by said lever, a spring-drawn flash for said indicator, a movable member carrying a pivoted latch for the flash and means operated by the lever for rocking the latch to release the flash.

6. In a cash-register the combination with an operating mechanism of a movable frame carrying a series of independent counters, a series of slides mounted independently of the frame and transfer-pawls mounted on said slides so as to move therewith and arranged to coact with any one of the counters which may be brought to operative position.

7. In a cash-register, the combination with an operating mechanism, of a series of independent counters, means for moving a desired counter into and out of connection with the operating mechanism, transfer devices mounted independently of the counters and adapted to coöperate with the counter in operative position and means for moving the transfer devices to cause them to follow the movements of a counter toward and away from the actuating mechanism.

8. In a cash-register the combination with an operating mechanism of a series of independent counters, a series of transfer-slides, mounted independently of the counters, transfer-pawls mounted on said slides and arranged to coact with the counter which is in operative position and trip-pawls mounted on the slides and controlling the positions of the transfer-pawls.

9. In a cash-register the combination with an operating mechanism, of a movable frame carrying a series of independent counters, means for moving the frame toward and away from the actuating mechanism, transfer devices mounted independently of the frame, and adapted to coöperate with the counter in operative position, and mechanism for moving the transfer devices to cause them to follow the movements of the frame toward and away from the actuating mechanism.

10. In a cash-register the combination with an operating mechanism, of a movable frame carrying a series of independent counters, means for moving said frame toward and away from the operating mechanism, devices for moving the frame to bring any desired counter to operative position, and transfer means mounted independently of the movable frame but arranged to move with said frame as the latter is adjusted to bring any counter out of operative connection with the operating mechanism.

11. In a cash-register the combination with an operating mechanism, of a movable frame carrying a series of independent counters, means for moving the frame toward and away from the operating mechanism, and a movable alining device arranged to correct any misalinement of the frame in moving toward the operating mechanism.

12. In a cash-register the combination with an operating mechanism, of a movable frame carrying a series of independent counters, and arranged to be moved toward and away from the operating mechanism, devices mounted independently of the frame for moving the same, and movable alining devices for the frame arranged to be brought into connection therewith when the frame is disengaged from the devices for adjusting the same.

13. In a cash-register the combination with a register-operating mechanism, of a movable frame carrying a series of independent counters, a manually-operated adjusting-lever for moving said frame to bring the desired one of said counters into position for operative connection with the operating mechanism, actuating means for bringing said counter into operative engagement with the operating mechanism and locking means controlled by said adjusting-lever for preventing movement of the said operating mechanism until said lever has been moved.

14. In a cash-register the combination with a register-operating mechanism, of a movable frame carrying a series of independent counters, a setting or adjusting lever for moving said frame, a pivoted lever arranged to be operated every time the setting-lever is moved, and a lock for the machine operated by the pivoted lever.

15. In a cash-register the combination with a register-operating mechanism, of a movable frame carrying a series of independent counters, a setting-lever for moving said frame and a lock arranged to lock the machine until the setting-lever is operated.

16. In a cash-register the combination with an operating mechanism, of a movable frame carrying a series of independent counters, a series of transfer-bars mounted independently of the frame, transfer-pawls mounted on said bars, a pivoted frame for supporting said bars, and means connected to the movable parts of the machine for operating the pivoted frame.

17. In a cash-register the combination with register-operating mechanism, of a movable frame carrying a series of independent counters, a series of slidable transfer-bars capable of being raised or lowered, transfer-pawls mounted on said bars and means for successively sliding the transfer-bars to effect the transfer.

18. In a cash-register the combination with a register-operating mechanism, of a rotary drum carrying a series of independent counters, a lever for moving said drum to bring the desired counter to operative position, an index-plate and a pointer on said lever arranged to travel over said plate.

19. In a cash-register the combination with a register-operating mechanism, of a movable frame carrying a series of independent counters, a lever for moving said frame, a series of special counters, operating means for said latter counters and devices connecting said lever and operating means to adjust the latter to operate a special counter corresponding to the position indicated by the lever.

20. In a cash-register the combination with a register-operating mechanism, of a series of independent counters, a single lever for bringing the proper counter to operative position, a series of special counters, and operating means for said latter counters arranged to be set by said lever.

21. In a cash-register the combination with a register-operating mechanism, of a series of independent counters, a single lever for moving the desired counter to operative position, a series of special counters, a rock-shaft carrying arms for operating said special counters and means connected to the lever for moving said shaft longitudinally to bring the proper arm into position to operate its counter.

22. In a cash-register the combination with a register-operating mechanism, of a series of independent counters, a lever for bringing said counters into operative relation with the aforesaid mechanism, a series of special counters, a rock-shaft having arms arranged to operate the special counters and provided with a rack, and gearing connected to said lever and arranged to coöperate with the rack to move the rock-shaft longitudinally.

23. In a cash-register the combination with a register-operating mechanism, of a movable frame carrying a series of independent counters, an adjusting-lever for moving said frame to bring the desired counter to operative position, a series of special counters, a rock-shaft carrying a number of arms for operating the special counters, and means connected to the lever for moving said shaft.

24. In a cash-register the combination with a register-operating mechanism, of a movable frame carrying a series of independent counters, a single lever for moving said frame to bring the desired counter to operative position, an indicator, and means connecting said lever to the indicator.

25. In a cash-register the combination with a register-operating mechanism of a series of nested sleeves operated by the same, a series of yokes connected to said sleeves, a series of gears carried by said yokes, a movable frame carrying a series of independent counters, and a single lever for adjusting said frame to bring the desired counter into operative position in relation to the gears.

26. In a cash-register the combination with a register-operating mechanism, of a series of nested sleeves connecting therewith, a series of yokes connected to said sleeves, a series of gears connected to said yokes, and a movable frame carrying a plurality of independent counters arranged to be brought into connection with said gears.

27. In a cash-register the combination with a register-operating mechanism, of a series of nested sleeves connecting therewith, a series of yokes connected to the said sleeves, operating-gears connected to said yokes, and a counter arranged to be brought into mesh with and disengaged from said gears.

28. In a cash-register the combination with a register-operating mechanism, of a rotary drum, a series of independent registers, a pivoted hand-lever for moving said drum to bring the desired register to operative position, an index-plate over which said lever operates, a special indicator for the respective registers, gearing for operating said indicator, and means for connecting said lever to said gearing.

29. In a cash-register the combination with a register-operating mechanism, of a series of independent counters, an adjusting-lever for moving any one of said counters to operative position at will, a second lever arranged to be actuated upon a movement of said adjusting-lever, and a latch for the machine adapted to be actuated by said second lever.

30. In a cash-register the combination with a register-operating mechanism, of a series of independent counters, a setting-lever for moving any one of said counters to operative position, a stud or projection mounted on said lever, an alining-lever engaging said stud, and a latch arranged to be operated by said alining-lever.

32. In a cash-register the combination with a register-operating mechanism, of a series of independent counters, a single lever for bringing any one of said counters to operative position, and means for locking said lever against movement after the operation of the machine has commenced.

32. In a cash-register the combination with a register-operating mechanism, of a series of independent counters, an adjusting-lever for moving any one of said counters to operative position, a second lever arranged to be actuated by the setting-lever, a latching-arm connected to the second lever and a notched disk coöperating with said arm to prevent movement of the adjusting-lever after the operation of the machine has commenced.

33. In a cash-register the combination with a register-operating mechanism, of a series of independent counters, a lever for bringing any one of said counters to operative position, a special indicator connected to said lever, a shutter or flash for said indicator, a latch for said shutter, and means connected to the lever for operating said latch.

34. In a cash-register the combination with a register-operating mechanism, of a series of independent counters, an adjusting-lever for bringing any one of said counters to operative position, a second lever arranged to be moved upon the movement of the setting-lever, a special indicator, a flash for the same, a latch for the flash and means connected to said second lever for tripping the latch.

35. In a cash-register the combination with a register-operating mechanism, of a main or totalizing counter, a series of independent counters, a lever for moving any one of said independent counters to operative position, a slide arranged to be set by said lever, throw-out devices for the main counter and means connecting said slide and throw-out devices.

36. In a cash-register the combination with a register-operating mechanism, of a series of independent counters, a special indicator for said counters, a shutter or flash for said indicator, a latch for said shutter, an adjusting-lever for moving the desired counter to operative position, and means coöperating with said lever for tripping said latch.

37. In a cash-register the combination with a register-operating mechanism, of a series of independent counters, an adjusting-lever for moving any one of said counters to operative position, a stud mounted on said lever, a serrated lever arranged to engage said stud, a rock-shaft adapted to be operated by said latter lever, a latch-lever on said shaft and a latching member carrying a spring-pressed plunger which coöperates with said latch-lever.

38. In a cash-register the combination with an operating mechanism, of a movable frame carrying a series of independent counters all of which are normally disconnected from the operating mechanism, means for connecting at will any one of the said counters with the operating mechanism, a single series of transfer devices arranged to coöperate with any counter that may be brought into operative connection with the operating mechanism, and means whereby said transfer devices coöperate with said counter whether the latter is in operative or inoperative connection with said operating mechanism.

39. In a cash-register the combination with a register-operating mechanism, of a series of independent counters mounted in a movable frame, a lever for adjusting the frame to bring any desired one of said counters into engagement with the register-operating mechanism and an alining-lever coöperating with a stud or projection carried or moved by said adjusting-lever.

40. In a cash-register the combination with a register-operating mechanism, of a series of independent counters mounted in a movable frame, a lever for adjusting the frame to bring any desired one of said counters into engagement with the register-operating mechanism, an alining-lever coöperating with a stud or projection carried or moved by said adjusting-lever and locking means for the register-operating mechanism which is controlled by said adjusting-lever.

41. In a cash-register the combination with a register-operating mechanism, of a main or totalizing counter, a series of independent counters, an adjusting-lever for bringing any one of said independent counters into operative relation with the register-operating means, means for disestablishing operative relation between said totalizing-counter and said operating mechanism, and a slide operated by said adjusting-lever to set said last-mentioned means so as to be operated when the register-operating mechanism is actuated.

42. In a cash-register the combination with a register-operating mechanism, of a plurality of counters, of a plurality of special counters one for each of the first-mentioned counters, and an adjusting-lever for simultaneously establishing an operative relation between one of the first-mentioned counters, its corresponding special counter and the register-operating mechanism substantially as described.

43. In a cash-register the combination with a register-operating mechanism, of a series of independent counters, an adjusting-lever for bringing any one of said counters into operative relation with the operating mechanism, actuating means, devices for locking said actuating means until after the adjusting-lever has been moved, and mechanism for locking said adjusting-lever after movement of the actuating means has commenced.

44. In a cash-register the combination with a register-operating mechanism, of a series of independent counters, an adjusting-lever for establishing an operative relation between one of said independent counters and the operating mechanism, the totalizing-counter and means controlled by the adjusting-lever to disestablish an operative relation between said totalizing-counter and the operating mechanism.

45. In a cash-register the combination with the register-operating mechanism, of a totalizing-counter, a series of independent counters, an adjusting-lever for bringing any one of the independent counters into operative relation with the operating mechanism, means for disestablishing operative relation between the operating mechanism and said totalizing-register, devices for setting said means by the movement of said adjusting-lever and means for operating said devices when so set, upon the movement of the machine.

46. In a cash-register the combination with a register-operating mechanism, of a totalizing-counter, a series of independent counters, an adjusting-lever for bringing any one of said independent counters into operative relation with the register-operating means, means for disestablishing operative relation between said totalizing-register and said operating mechanism and a slide operated by said adjusting-lever for actuating said means.

47. In a cash-register the combination with a register-operating mechanism, of a totalizing-counter, a series of independent counters, an adjusting-lever for moving any of said independent counters into operative relation with the register-operating mechanism, means for disestablishing operative relation between the main or totalizing counter and the register-operating mechanism, a rock-shaft, a cam rocking with said shaft, and devices connected to the lever for moving said means into operative relation with the cam.

48. In a cash-register the combination with the operating mechanism, of a frame carrying a series of independent registers, of a pinion carried by the frame, a rack-bar engaging the pinion, an adjusting-lever and a link pivoted at one end to the rack-bar and at the other to the adjusting-lever.

49. In a cash-register the combination with the operating mechanism, of the special counters, a shiftable shaft 110 carrying counter-actuating arms 111, the adjusting-lever arranged to shift the shaft and means for rocking the said shaft when the operated mechanism is actuated.

50. In a cash-register the combination with a register-operating mechanism, of the frame carrying a series of independent counters, a series of special counters, an adjusting-lever and means controlled thereby for simultaneously bringing one of said independent counters and one of the special counters into operative relation with the operating mechanism.

51. In a cash-register the combination with the operating mechanism, of a frame carrying a series of independent counters, an indicator corresponding to said independent counters and an adjusting-lever having connections with both said frame and the said indicator for simultaneously adjusting them.

52. In a cash-register, the combination with a counter-operating mechanism, of a totalizing-counter, a series of independent counters, a lever for moving any one of said independent counters to operative position and throw-out devices for the main counter arranged to be operated by said lever when moved to certain positions.

53. In a cash-register, the combination with an indicator, of a lever for setting the same, a flash for said indicator, a handle for operating said flash, and a lock arranged to lock the handle until the lever has been operated to set the indicator.

54. In a cash-register, the combination with a registering mechanism, of an indicator, a lever for adjusting said indicator, an operating-handle, and a lock arranged to lock the handle when the lever is in any of its adjusted positions and only unlock said handle when the lever is moved.

55. In a cash-register, the combination with a register-operating mechanism, of a series of independent counters, a setting-lever for bringing any one of the counters into coöperative relation with the operating mechanism, and a lock arranged to lock the machine when the lever is in any of its adjusted positions and only unlock the same when the lever is moved.

56. In a cash-register, the combination with a counter-operating mechanism, of a totalizing-counter, a series of independent counters, a hand device for moving all of the independent counters simultaneously to bring the desired one to operative position, and a throw-out device for the main totalizing-counter arranged to be operated by said hand device when the latter is moved to bring certain counters into operative position.

57. In a cash-register, the combination with a counter-operating mechanism, of a lock for the same, a totalizing-counter, a series of independent counters, a hand-lever for simultaneously moving all of the independent counters to bring one of the same to operative position, means operated by the lever for actuating the said lock, and throw-out devices for the main counter arranged to be operated by said lever when the same is moved to bring certain of the counters into operative position.

58. In a cash-register, the combination with the counter-operating mechanism, of a totalizing-counter, a series of independent counters, means for simultaneously moving all of the independent counters to bring a desired one of the same to operative position, and throw-out devices for the main counter arranged to be set by said counter-adjusting means so as to be subsequently operated by the regular movement of the machine.

59. In a cash-register, the combination with a counter-operating mechanism, of a totalizing-counter, a series of independent counters, a lever for moving any one of said independent counters to operative position, and throw-out devices arranged to be set by said lever for operation during the regular movement of the machine.

60. In a cash-register, the combination with a counter-operating mechanism, of a totalizing-counter, a series of independent counters, a pivoted lever for bringing any one of the independent counters to operative position, a throw-out device for the totalizing-counter arranged to be set by said lever, and cam means connected to the operating mechanism for actuating the throw-out devices during the regular movement of the machine.

61. In a cash-register, the combination with a counter-operating mechanism, of a series of independent counters any one of which may be brought into connection with said operating mechanism, and a single series of transfer-pawls for actuating the counter which is brought to operative position independently of its actuation in connection with the counter-operating mechanism.

62. In a cash-register, the combination with an operating mechanism, of a series of independent counters, any one of which may be brought into connection with said operating mechanism, a series of slides mounted independently of the counter, and transfer-pawls mounted on said slides so as to move therewith and arranged to coact with any one of the counters which may be brought to operative position.

63. In a cash-register, the combination with an operating mechanism, of a counter, means for moving the counter into and out of connection with the operating mechanism, transfer devices mounted independently of the counter, means for moving the transfer devices to cause them to follow the movement of the counter toward and away from the actuating mechanism, and means for actuating the transfer devices to effect a transfer when the counter is moved out of engagement with its operating mechanism.

In testimony whereof I affix my signature in the presence of two witnesses.

THOMAS CARROLL.

Witnesses:
JOHN C. LOCKYER,
IRA BERKSTRESSER.